US012578937B2

(12) United States Patent
Zeevi et al.

(10) Patent No.: US 12,578,937 B2
(45) Date of Patent: Mar. 17, 2026

(54) THIRD-PARTY CONTAINER-BASED DATA CONNECTION IN A DevOps ENVIRONMENT

(71) Applicant: ATLASSIAN PTY LTD., Sydney (AU)

(72) Inventors: Ofir Zeevi, Sydney (AU); Darcy Sanders, Sydney (AU); Sam Tannous, Sydney (AU)

(73) Assignee: ATLASSIAN PTY, LTD., Sydney (AU)

( * ) Notice: Subject to any disclaimer, the term of this patent is extended or adjusted under 35 U.S.C. 154(b) by 215 days.

(21) Appl. No.: 18/477,866

(22) Filed: Sep. 29, 2023

(65) Prior Publication Data

US 2025/0110714 A1      Apr. 3, 2025

(51) Int. Cl.
*G06F 8/36*          (2018.01)
*G06F 8/70*          (2018.01)
*G06F 21/31*        (2013.01)

(52) U.S. Cl.
CPC .................. *G06F 8/36* (2013.01); *G06F 8/70* (2013.01); *G06F 21/31* (2013.01)

(58) Field of Classification Search
CPC .............. G06F 8/36; G06F 8/70; G06F 21/31
USPC .................. 717/105–120, 168–174, 68–174
See application file for complete search history.

(56) References Cited

U.S. PATENT DOCUMENTS

| | | | | |
|---|---|---|---|---|
| 7,401,324 | B1 * | 7/2008 | Dmitriev | G06F 11/3466 717/130 |
| 7,904,802 | B1 * | 3/2011 | Kolawa | G06Q 10/06 715/230 |
| 9,021,448 | B1 * | 4/2015 | Gagliardi | G06F 8/70 717/133 |
| 9,841,960 | B2 * | 12/2017 | Dahan | G06F 8/47 |
| 10,404,474 | B1 * | 9/2019 | Caceres | H04L 9/3268 |
| 10,810,003 | B2 * | 10/2020 | Gainsborough | G06F 8/65 |
| 11,068,243 | B2 * | 7/2021 | Modeel | G06F 8/41 |
| 11,645,069 | B2 * | 5/2023 | Kalsi | G06F 21/6218 717/120 |
| 11,973,784 | B1 * | 4/2024 | Erlingsson | G06F 9/5077 |
| 2022/0311794 | A1 * | 9/2022 | Maya | G06F 11/0766 |
| 2023/0229561 | A1 * | 7/2023 | Iyer | G06F 11/1451 711/162 |

OTHER PUBLICATIONS

Leite et al, "A Survey of DevOps Concepts and Challenges", ACM, pp. 1-35 (Year: 2019).*

(Continued)

*Primary Examiner* — Anil Khatri
(74) *Attorney, Agent, or Firm* — Alston & Bird LLP

(57)          ABSTRACT

Apparatuses, methods, systems, and computer program products provide for third-party DevOps tool data connection in a DevOps environment. A generic container connection model defining a generic container connection protocol is generated. Based on the generic container connection model and interaction with a third-party DevOps tool, a generic container connection is established with the third-party DevOps tool to access DevOps data generated via the third-party DevOps tool. Receive, from the third-party DevOps tool based on the generic container connection, DevOps data associated with a software development project executed at least in part using the third-party DevOps tool.

16 Claims, 7 Drawing Sheets

600

GENERATE ONE OR MORE GENERIC CONTAINER CONNECTION MODELS — 602

RECEIVE THIRD-PARTY CONTAINER CONNECTION REQUEST — 604

GENERATE AND TRANSMIT CONNECTION DATA OBJECT — 606

ESTABLISH A CONTAINER CONNECTION — 608

UPDATE MULTI-RESOURCE SOFTWARE DEVELOPOMENT WORK GRAPH — 610

(56)     References Cited

OTHER PUBLICATIONS

Zerouali et al, "ConPan: A Tool to Analyze Packages in Software Containers", IEEE, pp. 1-5 (Year: 2019).*

Zohaib et al, "Towards the successful execution of DevOps outsource software development process: A vision", ACM pp. 1-4 (Year: 2024).*

Monteiro, "A proposal to systematize introducing DevOps into the software development process", IEEE, pp. 1-3 (Year: 2021).*

Shubham et al, "The Impact of Devops on Software Quality", IEEE, pp. 1-6 (Year: 2024).*

J. Pasuksmit et al., "Improving Agile Planning for Reliable Software Delivery," 2023 IEEE/ACM 20th International Conference on Mining Software Repositories (MSR), Melbourne, Australia, 2023, pp. 25-26. doi: 10.1109/MSR59073.2023.00017.

Method, Apparatus, And System For Outputting Software Development Insight Components In A Multi-Resource Software Development Environment, U.S. Appl. No. 18/344,437.

\* cited by examiner

THIRD-PARTY CONTAINER CONNECTION SERVER COMPUTING DEVICE 106

200

MEMORY 201

PROCESSOR 202

INPUT/OUTPUT CIRCUITRY 203

COMMUNICATIONS CIRCUITRY 204

CONTAINER CONNECTION CIRCUITRY 205

TOOLCHAIN CIRCUITRY 206

600

GENERATE ONE OR MORE GENERIC CONTAINER CONNECTION MODELS — 602

RECEIVE THIRD-PARTY CONTAINER CONNECTION REQUEST — 604

GENERATE AND TRANSMIT CONNECTION DATA OBJECT — 606

ESTABLISH A CONTAINER CONNECTION — 608

UPDATE MULTI-RESOURCE SOFTWARE DEVELOPOMENT WORK GRAPH — 610

<u>700</u>

RECEIVE SOFTWARE DEVELOPMENT INDICATION — 702

RECEIVE DEVOPS DATA — 704

GENERATE AND RENDER RESOURCE TOOL INTERFACE — 706

THIRD-PARTY CONTAINER-BASED DATA CONNECTION IN A DevOps ENVIRONMENT

BACKGROUND

Various methods, apparatuses, and systems provide tools for users to plan, collaborate, execute, and monitor software development projects. Applicant has identified many deficiencies and problems associated with tools for executing, assessing, and improving software development related activities. Through applied effort, ingenuity, and innovation, many of these identified deficiencies and problems have been solved by developing solutions that are configured in accordance with the embodiments of the present disclosure, many examples of which are described in detail herein.

BRIEF SUMMARY

Embodiments of the present disclosure relate to apparatuses, methods, systems, and computer program products for third-party DevOps tool data connection in a DevOps environment. In accordance with one aspect, an apparatus comprising at least one processor and at least one memory including computer program code is provided. In one embodiment, the at least one memory and the computer program code is configured to, with the at least one processor, cause the apparatus to generate a generic container connection model defining a generic container connection protocol; establish, based on the generic container connection model and interaction with a third-party DevOps tool, a generic container connection with the third-party DevOps tool to access DevOps data generated via the third-party DevOps tool; and receive, from the third-party DevOps tool based on the generic container connection, DevOps data associated with a software development project executed at least in part using the third-party DevOps tool.

In accordance with another aspect, a method is provided. In one embodiment, the method may comprise generating a generic container connection model defining a generic container connection protocol; receiving a third-party container connection request associated with a third-party DevOps tool identifier; establishing, based on the generic container connection model and interaction with a third-party DevOps tool associated with the third-party DevOps tool identifier, a generic container connection with the third-party DevOps tool to access DevOps data generated via the third-party DevOps tool; and receiving, from the third-party DevOps tool based on the generic container connection, DevOps data associated with a software development project executed at least in part using the third-party DevOps tool.

In accordance with another aspect at least one non-transitory computer-readable storage medium having computer coded instructions is provided. In one embodiment, the at least one non-transitory computer-readable storage medium having computer coded instructions may be configured to, when executed by at least one processor generate a per-category generic container connection model for a category identifier of a plurality of category identifiers, the per-category generic container connection model defining a generic container connection protocol associated with the category identifier; establish, based on the per-category generic container connection model and interaction with a third-party DevOps tool, a generic container connection with the third-party DevOps tool to access DevOps data generated via the third-party DevOps tool; and receive, from the third-party DevOps tool based on the generic container connection, DevOps data associated with a software development project executed at least in part using the third-party DevOps tool.

BRIEF DESCRIPTION OF THE SEVERAL VIEWS OF THE DRAWINGS

Figure 1:
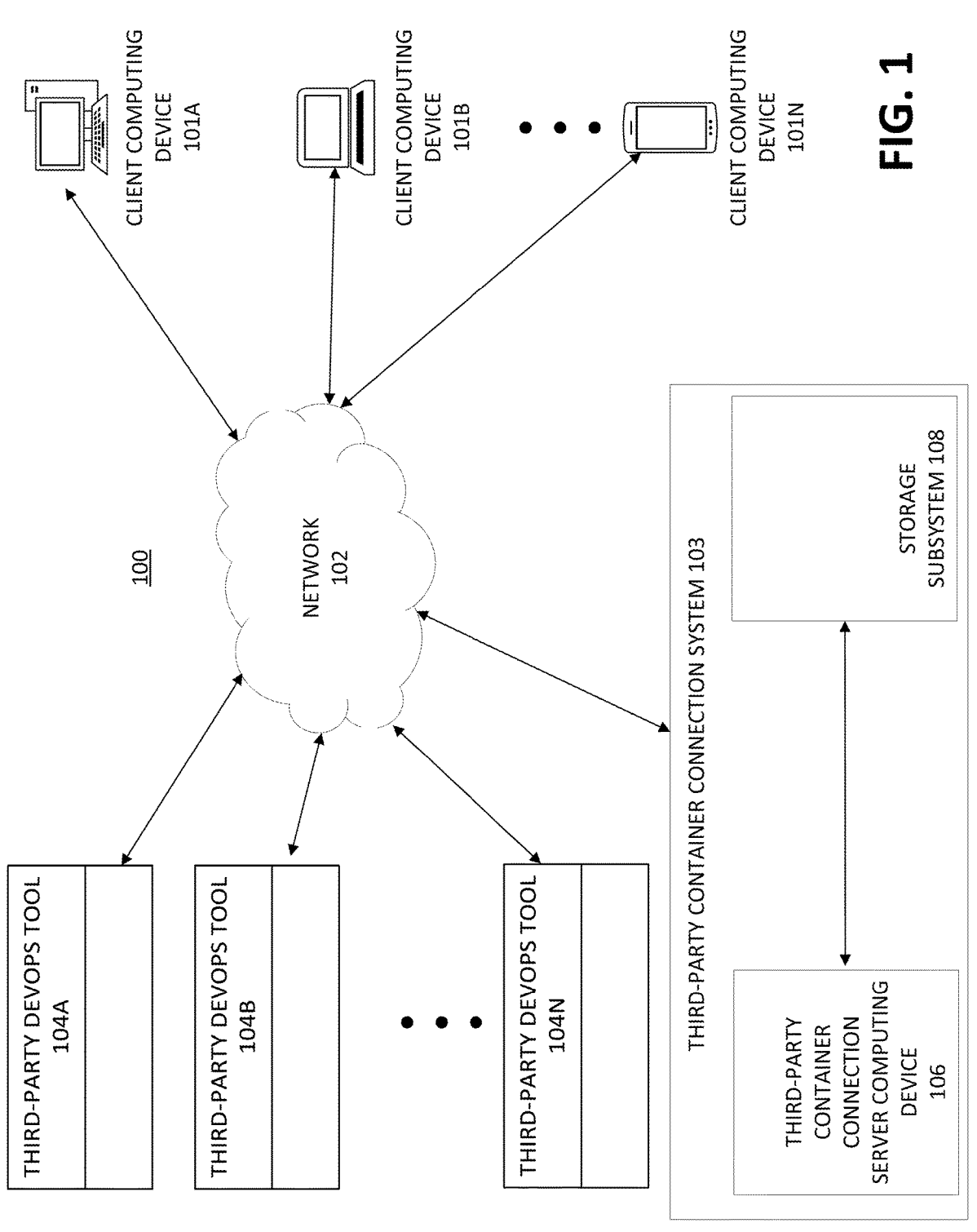

Having thus described some embodiments in general terms, references will now be made to the accompanying drawings, which are not drawn to scale, and wherein:

FIG. 1 illustrates an example third-party container connection system in accordance with at least some embodiments of the present disclosure.

Figure 2:
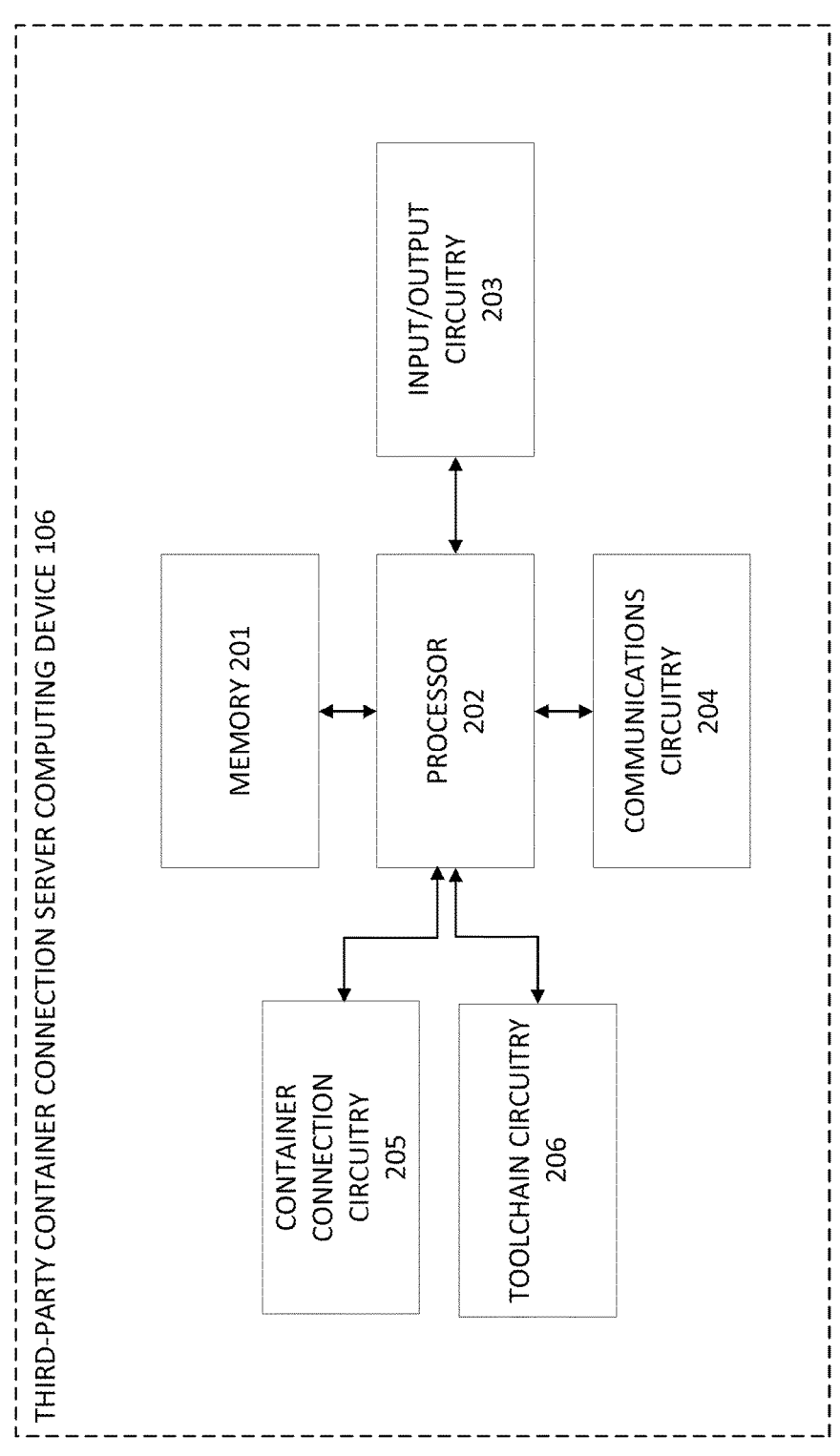

FIG. 2 illustrates a schematic block diagram of example apparatus to perform various operations in accordance with at least some embodiments of the present disclosure.

Figure 3:
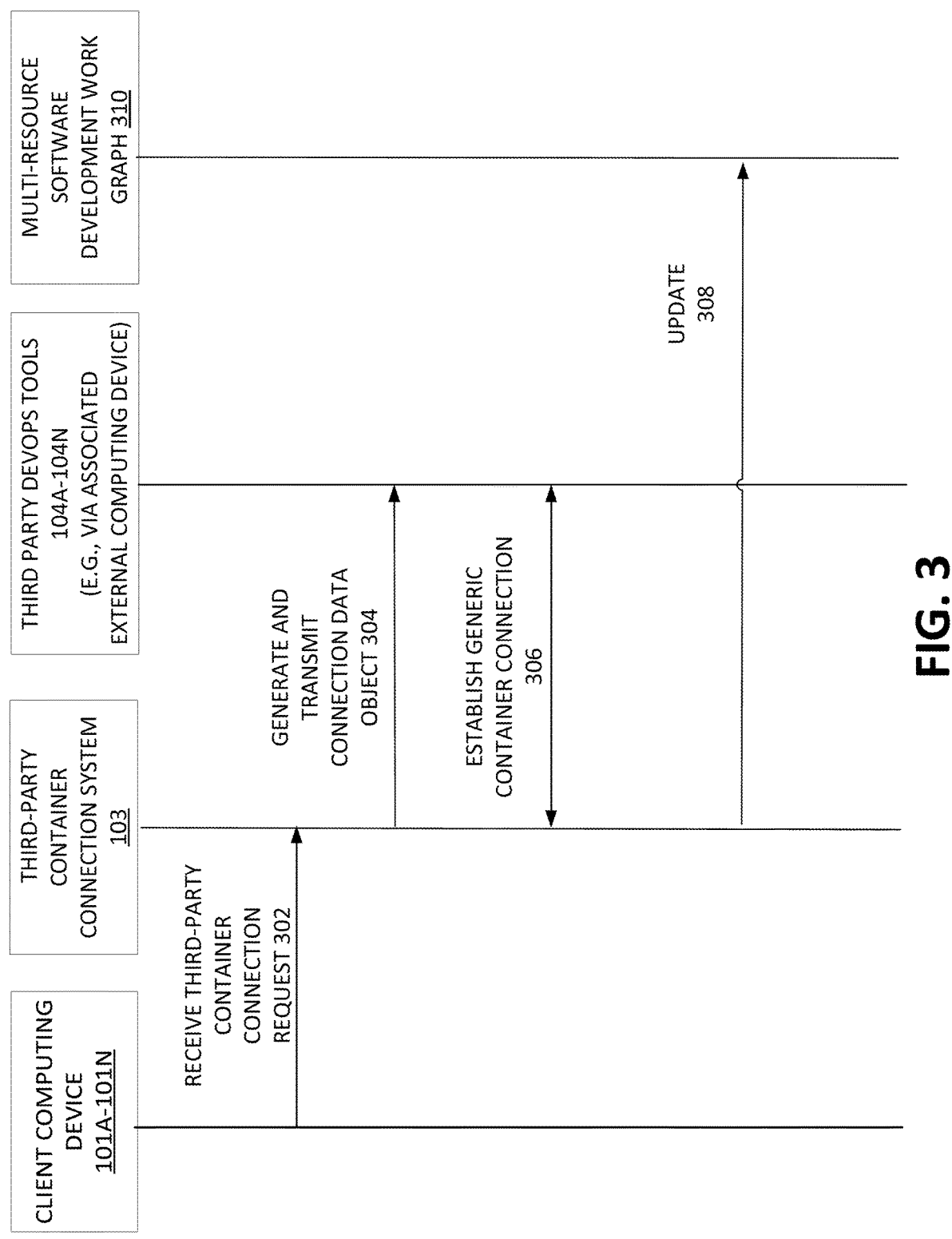

FIG. 3 illustrates a visualization of an example data environment for establishing generic container connection between third-party DevOps tools and a DevOps data connection platform in accordance with at least some embodiments.

Figure 4:
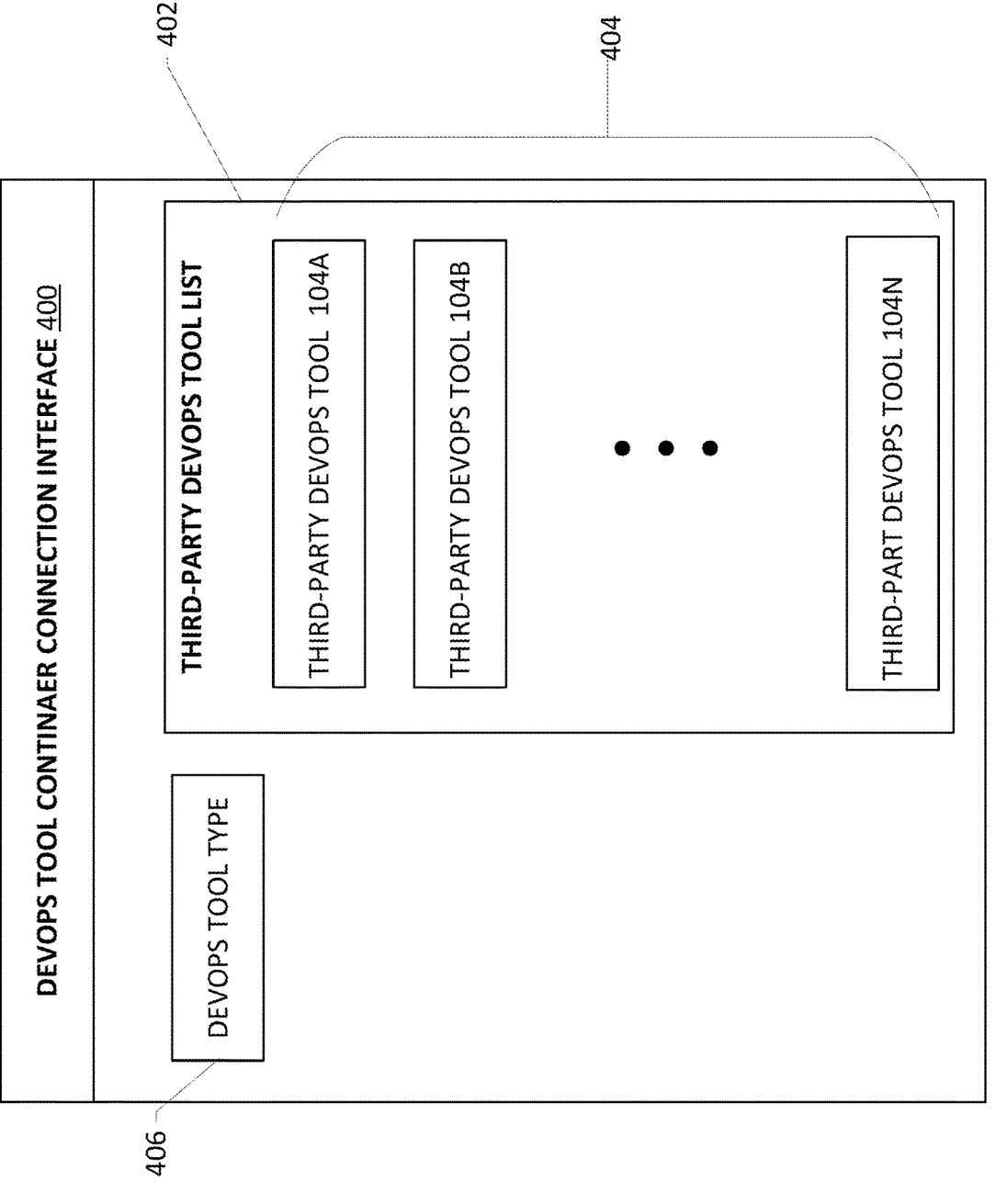

FIG. 4 illustrates an example third-party DevOps tool container connection interface in accordance with at least some embodiments of the present disclosure.

Figure 5:
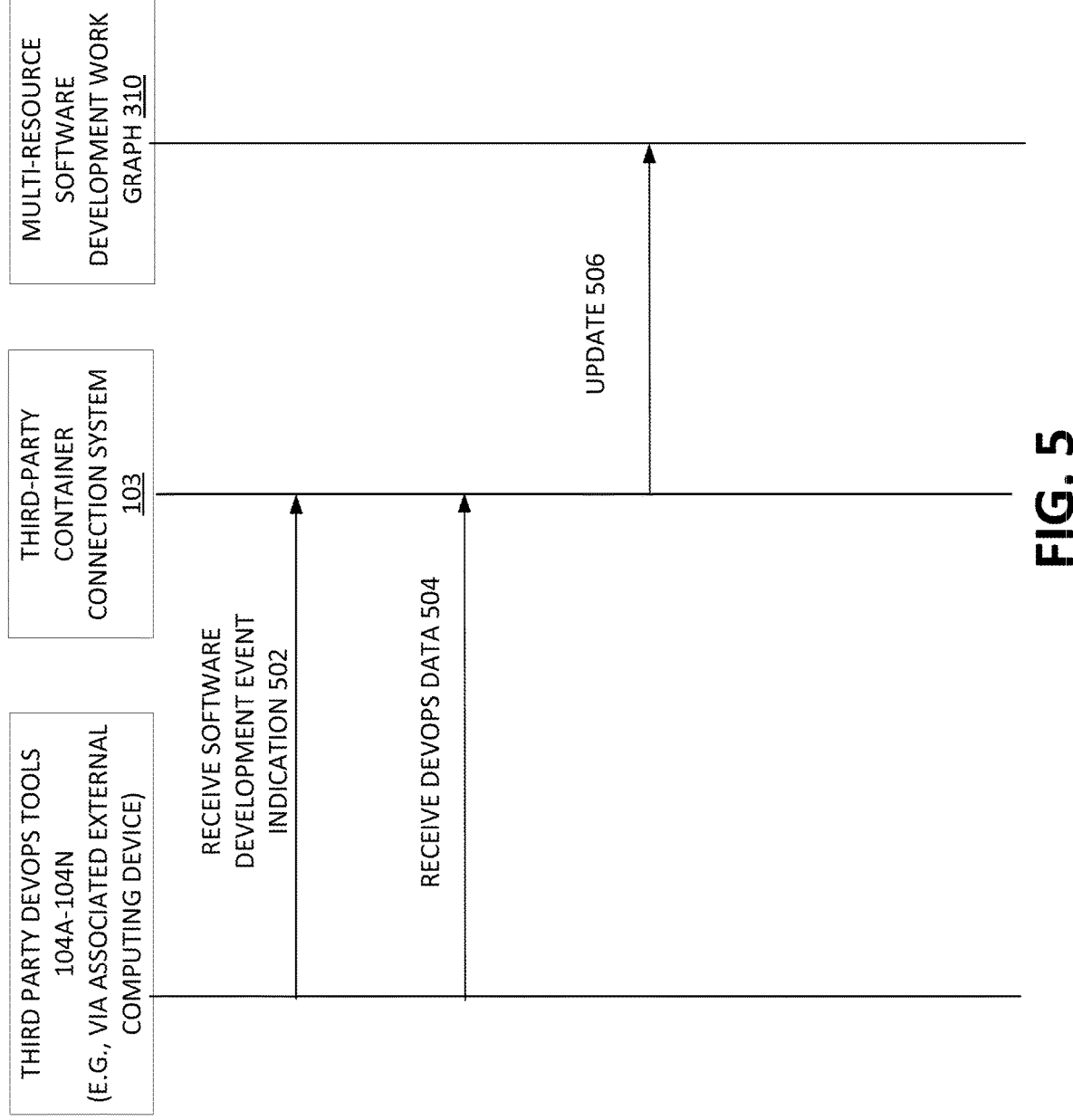

FIG. 5 illustrates a visualization of an example data environment for providing visibility in a DevOps environment in accordance with at least some embodiments of the present disclosure.

Figure 6:
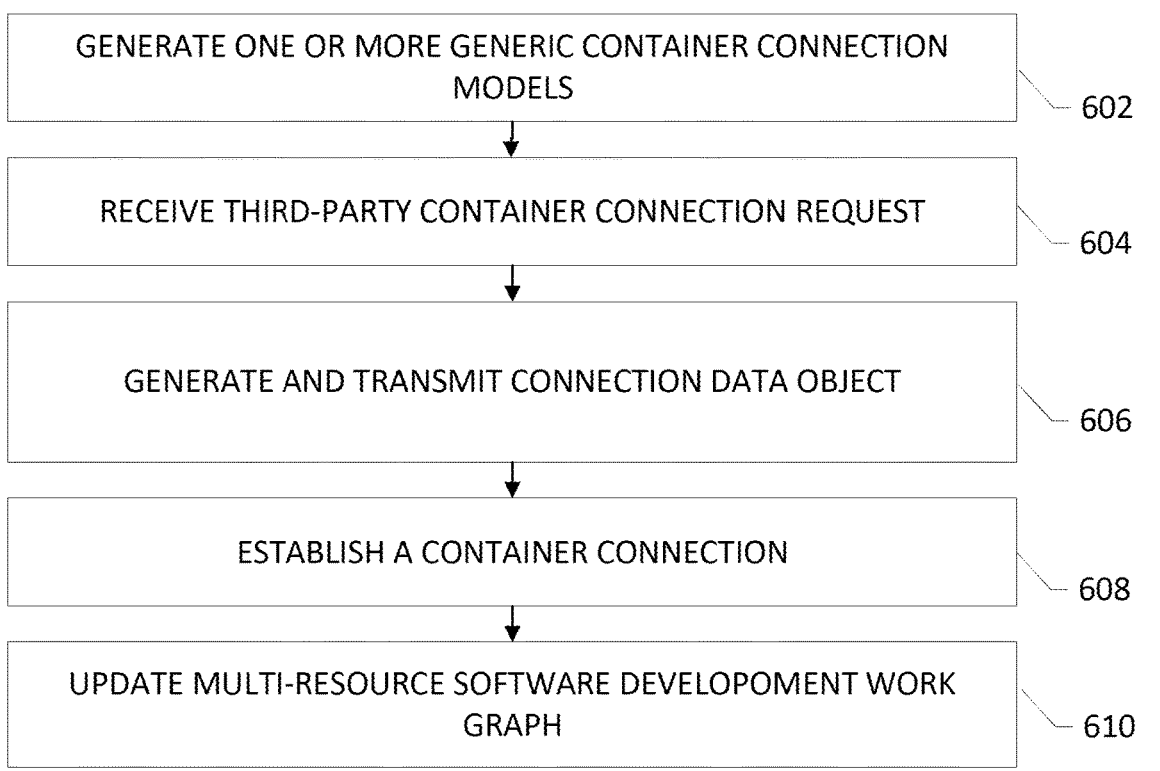

FIG. 6 illustrates a flowchart including example operations of an example process for integrating third-party DevOps tools with an DevOps data connection platform in accordance with at least some embodiments of the present disclosure.

Figure 7:
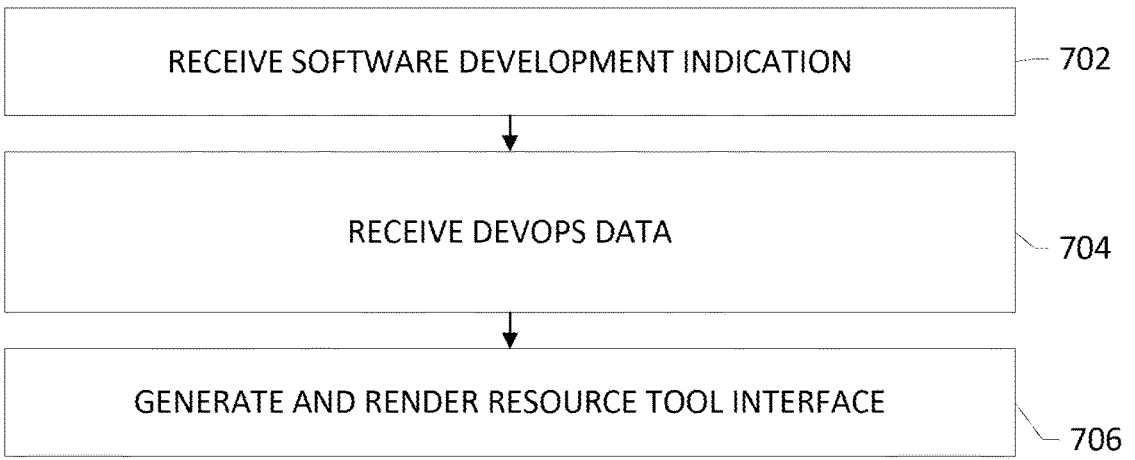

FIG. 7 illustrates a flowchart including example operations of an example process for providing visibility in a DevOps environment in accordance with at least some embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the present disclosure may be embodied in many different forms and should not be construed as limited to the embodiments set forth herein, rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

Overview and Technical Improvements

Various embodiments of the present disclosure address technical problems associated with various phases of software development, including ideating/discovering phase, planning phase, building phase, testing phase, monitoring phase deploying phase, operating phase, and continuous feedback phase. In particular, various embodiments address technical problems associated with visibility in a DevOps environment/toolchain that allow various tools, often from a variety of third-parties to be used across a DevOps lifecycle to accelerate development and deployment cycles. A DevOps environment/toolchain may include a collection of tools from a variety of third-parties that operate as an integrated unit to design, build, test, manage, measure, and operate software development. For example, a DevOps team can use Jira DevOps tool in the discover phase and planning phase, Kubernetes DevOps tool in the planning phase for provisioning individual development environments, GitHub DevOps tool for collaborative coding, Jenkins DevOps tool for continuous integration, Synk DevOps tool in the testing phase, and/or the like.

Conventional systems that implement a DevOps environment/toolchain suffer from lack of visibility, which in turn, limits the capabilities and flexibilities of DevOps environments/toolchains. For example, conventional systems are associated with inefficiencies and high resource consumption with regard to establishing connections with third-party DevOps tools at least in part due to high-touch engagement, complexity, and significant time commitment by third-party DevOps tool providers. Moreover, conventional systems that implement a DevOps environment/toolchain lack a consistent integration mechanism and suffer from a proliferation of fragmented integrations and unscalable interactions between the DevOps environment/toolchain and third-party DevOps tool providers. These inefficiencies, high resource consumption, and lack of consistent integration mechanism result in a high barrier to entry by third-party DevOps tool providers.

Applicant has identified a need for providing a system configured to provide visibility in a DevOps environment/toolchain via a single system. Thus obviating the need for DevOps teams to navigate to and access multiple systems searching for some visibility and/or insight into the DevOps environment. By obviating the need to navigate to and access multiple system, embodiments of the present disclosure reduce network traffic, improve efficiency, and provide visibility that facilitates optimization and improvement in the DevOps environment.

Example embodiments of the present disclosure provide a scalable container-based platform for establishing third-party DevOps tools data connection and utilize generic container connection techniques. Example embodiments of the present disclosure leverage generic container connection models that define object schemas configured to enable efficient mapping of third-party DevOps tools objects and data structures. By utilizing generic container connection techniques to establish third-party DevOps tools data connections, embodiments of the present disclosure facilitate seamless and efficient third-party DevOps tool data connection. Moreover, by utilizing generic container connection techniques and a scalable container-based platform to establish third-party DevOps tools data connections, embodiments of the present disclosure provide improved DevOps toolchain visibility, flexibility, and scalability which, in turn, optimizes and improves execution and delivery of software development projects. Such improved execution might involve identification and deployment of suitable DevOps tools as well as more effective planning, executing, monitoring, assessing, and scheduling software development tasks.

Definitions

The terms "data," "content," "digital content," "digital content object," "signal," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization, or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client computing device," "computing device," "client device," "network device," "computer," "user equipment," and similar terms may be used interchangeably to refer to a computer comprising at least one processor and at least one memory. In some embodiments, the client computing device may further comprise one or more of a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client computing device" may refer to computer hardware and/or software that is configured to access a service made available by a server. The server is often, but not always, on another computer system, in which case the client computing device accesses the service by way of a network. Embodiments of client computing devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to hardware-only circuit implementations (e.g., implementations in analog circuitry and/or digital circuitry); software-only implementations; combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose-built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The terms "application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked or remote computing devices, such as, but not limited to, client computing devices. Non-limiting examples of an application comprise project management, workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The term "DevOps data connection platform" refers to a system configured to provide visibility in a DevOps environment. A DevOps data connection platform, for example, may be configured to provide visibility to DevOps teams (e.g., developer team members, IT team members, and/or the like) and/or other stakeholders in a DevOps environment in a single system. The DevOps data connection platform may be configured to interact with one or more DevOps tools/applications, including third-party DevOps tools/applications to access, collect, analyze, process, integrate, transform, display, and/or the like DevOps data generated and/or maintained via the one or more DevOps tools/applications. The DevOps data connection platform, for example, may be configured to collect data across a particular software development pipeline to provide visibility to DevOps teams and/or other stakeholders to facilitate improvement across software development lifecycle. In some examples, the DevOps data connection platform may comprise one or more computing devices (e.g., server computing device, cloud computing device, and/or the like) in communication with one or more external computing devices associated with third-party DevOps tools/applications. In some embodiments, the DevOps data connection platform is configured to facilitate and establish a container connection with the third-party DevOps tools/applications to receive and/or otherwise access DevOps data generated and/or maintained via the third-party DevOps tools/applications. The DevOps data connection platform may be a container-based platform configured to receive data containers from third-party DevOps tools/applications to provide visibility in a DevOps environment.

The term "data container" refers to a data structure configured to store and organize virtual objects comprising data and procedures to manipulate the data. The data container, for example, may include the necessary dependencies. In some embodiments, a third-party DevOps tool/application may be configured to transmit or otherwise enable access to DevOps data generated and/or maintained via the DevOps tool/application. For example, a DevOps data connection platform may be configured to receive, retrieve, or otherwise access DevOps data generated and/or maintained by one or more DevOps tools/applications via a data connection.

The term "third-party DevOps tool," "third-Party DevOps applications" and "third-party DevOps resource" refer to a software program, application product, platform, or service configured to be utilized in a DevOps environment to execute one or more phases of a DevOps lifecycle. For example, a third-party DevOps tool may be leveraged by DevOps teams to execute one or more portions of a software development project. A third-party DevOps tool, for example, may form part of an open toolchain associated with a DevOps environment and may be accessed or otherwise leveraged by client computing devices associated with DevOps team to facilitate execution and delivery of software development projects. For example, a particular third-party DevOps tool may be associated with a discover phase of a DevOps lifecycle and configured to provide resources/services for executing activities, tasks, work units, and/or the like associated with the discover phase. As another example, a particular third-party DevOps tool may be associated with a plan phase of a DevOps lifecycle and configured to provide resources/services for executing activities, tasks, work units, and/or the like associated with the plan phase. As yet another example, a particular third-party DevOps tool may be associated with a build phase of a DevOps lifecycle and configured to provide resources/services for executing activities, tasks, work units, and/or the like associated with the build phase. It would be appreciated that a particular third-party DevOps tool may be associated with and configured to provide resources/services for executing activities, tasks, work units, and/or the like associated with other phases of a DevOps lifecycle (e.g., monitor phase, operate phase, continuous feedback phase, and/or the like). The third-party DevOps tool may operate on a compiled code base or repository that is separate and distinct from that which supports the DevOps data connection platform. For example, a third-party DevOps tool may be an application product that is provided by a third-party, and which is stored and maintained by the third-party. In some embodiments, the third-party DevOps tool may communicate with the DevOps data connection platform via a container connection protocol established by the DevOps data connection platform. For example, a third-party DevOps tool may be integrated with a DevOps data connection platform such that DevOps data generated and/or maintained via the third-party DevOps tool may be transmitted, retrieved, or otherwise accessible to the DevOps data connection platform.

The term "third-party DevOps tool identifier" refers to one or more items of data by which a third-party DevOps tool may be uniquely identified. For example, a third-party identifier may comprise one or more of American Standard Code for Information Interchange (ASCII) text, encryption keys, identification certificates, a pointer, an Internet Protocol (IP) address, a URL, a MAC address, a memory address, or other unique identifier, or combinations thereof.

The term "connection data object" refers to a data object comprising data/information configured to facilitate third-party DevOps tool container connection with a DevOps data connection platform. In some embodiments, the connection data object comprises information describing a container connection protocol for establishing a container connection with the DevOps data connection platform. Alternatively or additionally, the connection data object may comprise instructions for establishing a container connection with the DevOps data connection platform. In some embodiments, the container connection may be a generic container connection (e.g. global generic container connection, category-based generic connection, and/or the like). Alternatively or additionally, the connection data object may comprise a network endpoint with which a communication link may be established to enable container connection between a third-party DevOps tool and the DevOps data connection platform. In some embodiments, the connection data object may comprise security layers specifications, system protocols, and/or other guidelines/requirements to achieve third-party DevOps tool container connection.

The term "user identifier" refers to one or more items of data by which a user may be uniquely identified. For example, a user identifier may comprise one or more of American Standard Code for Information Interchange (ASCII) text, encryption keys, identification certificates, a pointer, an Internet Protocol (IP) address, a URL, a MAC address, a memory address, or other unique identifier, or combinations thereof.

The term "team identifier" refers to one or more items of data by which a team or team unit comprising one or more team members may be uniquely identified. For example, a team identifier may comprise one or more of ASCII text, encryption keys, identification certificates, a pointer, an IP address, a URL, a MAC address, a memory address, or other unique identifier, or combinations thereof.

The term "third-party container connection requests" refers to a data object that describes a request to establish a data connection between a third-party DevOps tool and a DevOps data connection platform. In some embodiments, a third-party container connection request may comprise a third-party DevOps tool identifier. In some embodiments, the third-party container connection request may be generated by a client computing device and/or an external computing device.

The term "software development event indication" refers to a data object that is generated and/or created by a computing device in response to certain events related to a DevOps lifecycle. Such events may include a software project development generation event, an issue object generation event, and/or the like. In some embodiments, a software development event indication is configured to trigger rendering of a third-party DevOps tool container connection interface.

Example System Architecture

Methods, apparatuses, and computer program products of the present disclosure may be embodied by any of a variety of devices. For example, the method, apparatus, and computer program product of an example embodiment may be embodied by a networked device (e.g., a DevOps data connection platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, the like or any combination of the aforementioned devices.

FIG. 1 illustrates an example system architecture 100 within which embodiments of the present disclosure may operate. The architecture 100 includes a third-party container connection system 103 configured to interact with one or more third-party DevOps tools 104A-104N. In some embodiments, the third-party container connection system 103 is configured to interact with client computing devices 101A-101N. In some embodiments, the third-party container connection system 103 is configured to establish a container connection with the third-party DevOps tools 104A-104N to access DevOps data generated and/or maintained via the third-party DevOps tools 104A-104N. In this regard, the third-party container connection system 103 may be a container-based platform configured receive data containers from the one or more third-party DevOps tools 104A-104N via the container connection.

The third-party container connection system 103 may configured to interact with the one or more third-party DevOps tools 104A-104N via the container connection to collect, analyze, process, integrate, transform, display, and/or the like DevOps data generated and/or maintained via the one or more third-party DevOps tools 104A-104N. The third-party container connection system 103, for example, may be configured to provide visibility to DevOps teams in a DevOps environment, for example, in a single system (e.g., the third-party container connection system 103). In this regard, the third-party container connection system 103 may provide visibility and insights that facilitates improvement in a DevOps lifecycle. In some embodiments, the third-party container connection system 103 is configured to establish a container connection with a particular third-party DevOps tool in response to a third-party container connection request. The third-party container connection request, for example, may originate from a client computing device 101A-101N and/or an external computing device associated with a third-party DevOps tools 104A-104N.

The third-party container connection system 103 may comprise a third-party container connection server computing device 106 in communication with a storage subsystem 108. Such storage subsystem 108 may be hosted by the third-party container connection server computing device 106 or otherwise hosted by devices in communication with the third-party container connection server computing device 106. In some embodiments, storage subsystem 108 may comprise a separate system external to the third-party container connection system 103.

Third-party container connection server computing device 106 may include circuitry, networked processors, or the like configured to perform some or all of the third-party DevOps tool container connection server-based processes described herein and may be any suitable network server and/or other type of processing device. In some embodiments, third-party container connection server computing device 106 may determine and transmit commands and instructions for establishing a generic container connection with third-party DevOps tools 104A-104N, for example, in response to receipt of a third-party container connection request. In this regard, the third-party container connection server computing device 106 may be embodied by any of a variety of devices, for example, the third-party container connection server computing device 106 may be embodied as a computer or a plurality of computers. For example, third-party container connection server computing device 106 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals.

In some embodiments, third-party container connection server computing device 106 may be located remotely from the storage subsystem 108, although in other embodiments, the third-party container connection server computing device 106 may comprise the storage subsystem 108. The third-party container connection server computing device 106 may, in some embodiments, comprise several servers or computing devices performing interconnected and/or distributed functions. Despite the many arrangements contemplated herein, third-party container connection server computing device 106 is shown and described herein as a single computing device to avoid unnecessarily overcomplicating the disclosure.

Third-party container connection server computing device 106 can communicate with the client computing devices 101A-101N and/or external computing devices via one or more networks, such communications network 102. For example, the client computing devices 101A-101N and/or the external computing devices may access the third-party container connection system 103 via communications network 102. Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the third-party container connection system 103.

Storage subsystem 108 may be stored by any suitable storage device configured to store some or all of the information described herein (e.g., memory of the third-party container connection server computing device 106 or a separate memory system separate from the third-party container connection server computing device 106, such as one or more database systems, backend data servers, network databases, cloud storage devices, or the like provided by another device (e.g., online application or third-party provider), such as a Network Attached Storage (NAS) device or devices, or as a separate database server or servers. Storage subsystem 108 may comprise data received from the third-party container connection server computing device 106 (e.g., via a memory 201 and/or processor(s) 202), and the corresponding storage device may thus store this data. Storage subsystem 108 includes information accessed and stored by the third-party container connection server computing device 106 to facilitate container connection of third-party DevOps tools 104A-104N and/or other operations of the third-party container connection system 103. As such, Storage subsystem 108 may include, for example, without limitation, third-party DevOps tool identifiers (e.g., resource identifiers); DevOps-related data such as, for example, code pull request objects, code pull request identifiers; issue objects, issue object identifier(s), software development project identifiers; work unit identifiers; user identifiers; team identifiers; organization identifiers; metadata; resource tool map; multi-resource software development work graph (e.g., multi-resource software development work graph structure); and/or the like.

The client computing devices 101A-101N may be implemented as any computing device as defined above. Electronic data received by the third-party container connection server computing device 106 from the client computing devices 101A-101N may be provided in various forms and via various methods. For example, the client computing devices 101A-101N may include desktop computers, laptop computers, smartphones, netbooks, tablet computers, wearables, and/or other networked device, which may be used for any suitable purpose in addition to presenting a resource tool interface to a user, and otherwise providing access to the third-party container connection system 103. The depiction in FIG. 1 of "N" client computing devices is merely for illustration purposes. According to some embodiments, the client computing devices 101A-101N may be configured to display an interface on a display of the client computing device for viewing, creating, editing, and/or otherwise interacting with at least one user interface, which may be provided by the third-party container connection system 103.

In embodiments where a client computing device 101A-101N is a mobile device, such as a smartphone or tablet, the client computing device 101A-101N may execute an "app" to interact with the third-party container connection system 103. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client computing device 101A-101N may interact with the third-party container connection system 103 via a web browser. As yet another example, the client computing devices 101A-101N may include various hardware or firmware designed to interface with the third-party container connection system 103.

As described above the third-party DevOps tools 104A-104N may be associated with external computing devices configured for providing access to the third-party container connection system 103. In some embodiments, the external computing devices may be remote networked devices, such as a server or processing device, maintained by a third-party and configured to support the third-party DevOps tools 104A-104N and interact with the third-party container connection system 103 (e.g., third-party container connection server computing device 106) to establish container connection with the third-party container connection system 103. An external computing device may support at least one third-party DevOps tool. In some embodiments, the client computing devices 101A-101N can communicate with the external computing devices via the communications network 102. Electronic data received by the third-party container connection server computing device 106 from the external computing devices may be provided in various forms and via various methods. For example, the external computing devices may include desktop computers, laptop computers, smartphones, netbooks, tablet computers, wearables, and/or other networked device, which may be used for any suitable purpose in addition to providing access to the third-party container connection system 103. The depiction in FIG. 1 of "N" external computing devices is merely for illustration purposes. According to some embodiments, the external computing devices may be configured to display an interface on a display of the external computing device for viewing, creating, editing, and/or otherwise interacting with at least one user interface, which may be provided by the third-party container connection system 103.

Example Apparatus for Implementing Embodiments of the Present Disclosure

The third-party container connection server computing device 106 may be embodied by one or more computing systems, such as apparatus 200 shown in FIG. 2. In accordance with some example embodiments, the apparatus 200 may include various means, such as memory 201, processor 202, input/output circuitry 203, communications circuitry 204, container connection circuitry 205, and/or toolchain circuitry 206. The apparatus 200 may be configured to execute the operations described herein. For example, one or more of components 201-206 may be configured to facilitate the functionality discussed herein regarding establishing container connections with third-party DevOps tools 104A-104N such that DevOps data generated via the third-party DevOps tools 104A-104N in connection with one or more software development projects may be provided or otherwise accessed by a DevOps data connection platform. The DevOps data connection platform, for example, may embody or otherwise comprise the third-party container connection system 103.

The container connection circuitry 205 may be configured to perform and/or support various functionalities of the third-party container connection system 103 including, for example, facilitating and/or establishing generic container connection with third-party DevOps tools 104A-104N based on a generic container connection model that defines a generic container connection protocol. The toolchain circuitry 206 may be configured to perform and/or support various functionalities of the third-party container connection system 103 including, for example, receiving, analyzing, processing, integrating, transforming, displaying, and/or the like DevOps data received from third-party DevOps tools 104A-104N, based on a generic container connection, to provide visibility to the DevOps teams and stakeholders. The visibility, in turn, may facilitate improvement and/or optimization of the various phases of a DevOps lifecycle.

Although these components 201-206 are described with respect to functional limitations, it should be understood that the particular implementations necessarily include the use of particular hardware. It should also be understood that certain of these components 201-206 may include similar or common hardware. For example, two sets of circuitries may both leverage use of the same processor, network interface, storage medium, or the like to perform their associated functions, such that duplicate hardware is not required for each set of circuitries.

Although the use of the term "circuitry" as used herein with respect to components 201-206 are described in some cases with respect to functional limitations, it should be understood that the particular implementations necessarily include the use of particular hardware configured to perform the functions associated with the respective circuitry as described herein. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry.

The term "circuitry" should also be understood, in some embodiments, to include software for configuring the hardware. For example, in some embodiments, "circuitry" may include processing circuitry, storage media, network interfaces, input/output devices, and the like. In some embodiments, other elements of the third-party container connection server computing device 106 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, third-party container connection server computing device 106. The memory 201 is non-transitory and may include, for example, one or more volatile and/or non-volatile memories, or some combination thereof. In other words, for example, the memory 201 may be an electronic storage device (e.g., a computer readable storage medium). The memory 201 may be configured to store information, data, content, applications, instructions, or the like, for enabling an apparatus, e.g., third-party container connection server computing device 106 to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling apparatus 200 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by apparatus 200 during the course of performing its functionalities.

Processor 202 may be embodied in a number of different ways and may, for example, include one or more processing devices configured to perform independently. Additionally or alternatively, processor 202 may include one or more processors configured in tandem via a bus to enable independent execution of instructions, pipelining, and/or multi-threading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as apparatus 200 (e.g., third-party container connection server computing device 106). The plurality of processors may be in operative communication with each other and may be collectively configured to perform one or more functionalities of apparatus as described herein.

In an example embodiment, processor 202 is configured to execute instructions stored in the memory 201 or otherwise accessible to processor 202. Alternatively or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause third-party container connection server computing device 106 to perform one or more of the functionalities of third-party container connection server computing device 106 as described herein.

In some embodiments, input/output circuitry 203 may, in turn, be in communication with processor 202 to provide an audible, visual, mechanical, or other output and/or, in some embodiments, to receive an indication of an input. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface (e.g., a project management user interface, a software development insight interface, and/or the like) and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In embodiments where apparatus 200 may be implemented as a third-party container connection server computing device 106, as shown in FIG. 2, aspects of input/output circuitry 203 may be reduced as compared to embodiments where apparatus 200 may be implemented as an end-user machine or other type of device designed for complex user interactions (i.e., client computing device). In some embodiments (like other components discussed herein), input/output circuitry 203 may even be eliminated from apparatus 200. Input/output circuitry 203 may be in communication with memory 201, communications circuitry 204, and/or any other component(s), such as via a bus. Although more than one input/output circuitry and/or other component can be included, only one is shown in FIG. 2 to avoid overcomplicating the disclosure (e.g., like the other components discussed herein).

Communications circuitry 204 may be any means such as a device or circuitry embodied in either hardware or a combination of hardware and software that is configured to receive and/or transmit data from/to a network and/or any other device, circuitry, or module in communication with apparatus 200. In this regard, the communications circuitry 204 may include, for example, a network interface for enabling communications with a wired or wireless communication network. Communications circuitry 204 may be configured to receive and/or transmit any data that may be stored by memory 201 using any protocol that may be used for communications between computing devices. For example, the communications circuitry 204 may include one or more network interface cards, antennae, transmitters, receivers, buses, switches, routers, modems, and supporting hardware and/or software, and/or firmware/software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of apparatus 200, such as via a bus.

Container connection circuitry 205 may be configured to perform the functionality discussed herein related to establishing container connection with third-party DevOps tools such that DevOps tools and/or DevOps data associated with one or more software development projects as well as interactions/relationships among and between the DevOps tools and/or DevOps data may be accessible to DevOps teams and stakeholders via a single system (e.g., e.g., third-party container connection system 103). The container connection circuitry 205 may implement a generic container connection protocol to facilitate generic container connection of third-party DevOps tools.

In some embodiments, the container connection circuitry 205 includes hardware components and/or software configured to receive third-party container connection requests from client computing devices and/or external computing devices. A third-party container connection request may comprise a request to establish a container connection between a particular third-party DevOps tool and the DevOps data connection platform (e.g., third-party container connection system 103)

In some embodiments, the container connection circuitry 205 includes hardware components and/or software configured establish a container connection between the third-party container connection server computing device 106 and third-party DevOps tools 104A-104N (e.g., via associated external computing devices). In some embodiments, the container connection circuitry 205 is configured to facilitate and/or establish a container connection in response to a third-party container connection request. As described above, in some embodiments, the third-party container connection request may originate from a client computing device (e.g., associated with a DevOps team member or stakeholder). Alternatively or additionally, the third-party container connection request may originate from an external computing device (e.g., associated with a third-party), as described herein.

In some embodiments, the container connection is a generic container connection configured to enable container connection with a plurality of third-party DevOps tools based on a generic container connect protocol. In this regard, the generic container connection may enable third-party DevOps tools to seamlessly and efficiently connect with a DevOps data connection platform (e.g., third-party container connection system 103) such that data containers may be efficiently and effortlessly provided by the third-party DevOps tools 104A-104N for access by the DevOps data connection platform (e.g., third-party container connection system 103).

In some embodiments, the generic container connection defines object schemas that easily map to third-party DevOps tools objects and data structures to facilitate seamless and efficient connection as described above. For example, the generic container connection may define a generic container connection protocol configured to enable seamless and efficient mapping of third-party DevOps tools objects and data structures. The generic container connection protocol, for example, may comprise a schema for mapping object and data structure associated with third-party DevOps tools to facilitate seamless and efficient connection. In some embodiments, the generic container connection protocol enables a seamless and efficient container connection at least in part by transmitting to, a third-party (e.g., associated external computing device), a connection data object comprising instructions and/or other information for establishing a secure and seamless container connection with the DevOps data connection platform (e.g., third-party container connection system 103). In some embodiments, the connection data object may comprise information describing a network endpoint with which a communication link may be established to enable container connection between the third-party DevOps tool and the DevOps data connection platform (e.g., third-party container connection system 103). Alternatively or additionally, in some embodiments, the connection data object may comprise security layers specifications, system protocols, and/or other guidelines/requirements to facilitate secure, seamless, and efficient container connection with third-party DevOps tools 104A-104N, as described herein.

In some embodiments, the container connection circuitry 205 includes hardware components and/or software configured to transmit the connection data object to an external computing device in response to a third-party container connection request. As described above, a third-party container request may comprise a request establish a container connection between a third-party DevOps tool and the DevOps data connection platform (e.g., third-party container connection system 103) such that DevOps data generated and/or maintained by the third-party DevOps tools 104A-104N in association with a software development project may be provided or otherwise accessed by the DevOps data connection platform (e.g., third-party container connection system 103).

In some embodiments, the container connection circuitry 205 includes hardware components and/or software configured to generate and render for display, on a client computing device 101A-101N, a third-party DevOps tool container connection interface. The third-party DevOps tool container connection interface may be configured to enable generation of a third-party container connection request and/or communication between an external computing device and the third-party container connection server computing device 106. The container connection circuitry 205, for example, may be configured to render the third-party DevOps tool container connection interface for display on a client computing device 101A-101N to allow users (e.g., DevOps Team members, stakeholders, and/or the like) to request data connection between a particular third-party DevOps tool and the third-party DevOps tool and the DevOps data connection platform (e.g., third-party container connection system 103). For example, third-party container connection request may be initiated in response to user engagement with the third-party DevOps tool container connection interface.

In some embodiments, the container connection circuitry 205 may provide the connection data object for access by the external computing device via the third-party DevOps tool container connection interface. It should be understood that the container connection circuitry 205 may provide the connection data object for access by the external computing device via other methods.

The container connection circuitry 205 may utilize processing circuitry, such as the processor 202, to perform its corresponding operations, and may utilize memory 201 to store collected information. The container connection circuitry 205 may send and/or receive data from storage subsystem 108. It should also be appreciated that, in some embodiments, the container connection circuitry 205 may include a separate processor, specially configured field programmable gate array (FPGA), or application specific interface circuit (ASIC) to perform its corresponding functions. For example, in some embodiments, some or all of the functionality of container connection circuitry 205 may be performed by processor 202. In this regard, some or all of the example processes and algorithms discussed herein can be performed by at least one processor 202 and/or container connection circuitry 205. For example, non-transitory computer readable storage media can be configured to store firmware, one or more application programs, and/or other software, which include instructions and other computer-readable program code portions that can be executed to control processors of the components of apparatus 200 to implement various operations, including the examples shown herein. As such, a series of computer-readable program code portions may be embodied in one or more computer program products and can be used, with a device, apparatus 200, database, and/or other programmable apparatus, to produce the machine-implemented processes discussed herein. It is also noted that all or some of the information discussed herein can be based on data that is received, generated and/or maintained by one or more components of the apparatus 200. In some embodiments, one or more external systems (such as a remote cloud computing and/or data storage system) may also be leveraged to provide at least some of the functionality discussed herein.

Toolchain circuitry 206 may be configured to perform the functionality discussed herein related to providing visibility in a DevOps environment. For example, the toolchain circuitry 206 may be configured to receive, analyze, process, integrate, transform, display, and/or the like DevOps data received from third-party DevOps tools 104A-104N via the generic container connection to provide visibility in a DevOps environment and facilitate improvement and/or optimization of the various phases of a DevOps lifecycle. The received DevOps data may be associated with one or more software development projects. For example, the received DevOps data may be generated in connection with the execution of one or more tasks, actions, work units, and/or the like associated with one or more software development projects. In this regard the DevOps data may be associated with one or more software development project identifiers, work unit identifiers, team identifier, team member identifier, and/or the like.

In some embodiments, the toolchain circuitry 206 includes hardware components and/or software configured to update a multi-resource software development work graph based on DevOps data received from the third-party DevOps tools 104A-104N. Alternatively or additionally, the toolchain circuitry 206 may include hardware components and/or software configured to facilitate generation and/or updating of a multi-resource software development work graph at least in part by providing the DevOps data to one or more other systems configured to generate and/or update the multi-resource software development work graph. Non-limiting examples of such DevOps data that may be received from the third-party DevOps tools 104A-104N include resource objects such as code pull requests, issue objects, code repository identifiers, commitments, and/or the like. In some embodiments, the toolchain circuitry 206 includes hardware components and/or software configured to render and/or facilitate rendering on a user interface the multi-resource software development work graph.

Example methods, systems, and apparatuses for generating a multi-resource software development work graph (e.g., multi-resource software development work graph structure)

are disclosed in commonly owned U.S. patent application Ser. No. 18/344,437 which is hereby incorporated by reference herein in its entirety.

In some embodiments, the toolchain circuitry 206 includes hardware components and/or software configured to render for display on a user interface a visualization of the DevOps tools, DevOps data, relationship between the DevOps tools and/or the DevOps data, and/or the like.

The toolchain circuitry 206 may utilize processing circuitry, such as the processor 202, to perform its corresponding operations, and may utilize memory 201 to store collected information. The toolchain circuitry 206 may send and/or receive data from storage subsystem 108, wherein such data may include DevOps data (e.g., resource objects, and/or the like) generated in connection with one or more software development projects executed in a DevOps environment. In some embodiments, the sent and/or received data may include one or more of multi-resource software development work graph structure(s), code pull request identifier(s), pull request status identifier(s) issue object identifier(s), issue object status identifier(s), resource identifier(s), resource provider identifier(s), user identifier, team identifier, team member identifier, development unit identifier, project identifier, resource identifier, customer identifier, pull request progress data, issue object status, issue object progress data, development unit past performance data, team member past performance data, and/or the like.

It should also be appreciated that, in some embodiments, the toolchain circuitry 206 may include a separate processor, specially configured field programmable gate array (FPGA), or application specific interface circuit (ASIC) to perform its corresponding functions. For example, in some embodiments, some or all of the functionality of toolchain circuitry 206 may be performed by processor 202. In this regard, some or all of the example processes and algorithms discussed herein can be performed by at least one processor 202 and/or toolchain circuitry 206. For example, non-transitory computer readable storage media can be configured to store firmware, one or more application programs, and/or other software, which include instructions and other computer-readable program code portions that can be executed to control processors of the components of apparatus 200 to implement various operations, including the examples shown herein. As such, a series of computer-readable program code portions may be embodied in one or more computer program products and can be used, with a device, third-party container connection server computing device 106, database, and/or other programmable apparatus, to produce the machine-implemented processes discussed herein. It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, back-end network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of apparatus 200.

The computing systems described herein can include clients and servers. A client and server are generally remote from each other and typically interact through a communications network. The relationship of client and server arises by virtue of computer programs running on the respective computers and having a client-server relationship to each other. In some embodiments, a server transmits information/ data (e.g., an HTML page) to a client computing device 101A-101N (e.g., for purposes of displaying information/ data to and receiving input from a user or third-party DevOps tool provider interacting with the client computing device 101A-101N and/or external computing device). Information/data generated at the client computing device 101A-101N and/or the external computing device (e.g., a result of the interaction) can be received from the client computing device 101A-101N and/or the external computing device at the server.

Example Data Environments and Architecture of the Disclosure

Having described example systems and apparatuses, example data architectures, data environments, and data flows will now be described. In some embodiments, the data architectures represent data object(s) maintained and processed in particular computing environments. In some embodiments, the computing environment(s) is/are maintained via hardware, software, firmware, and/or a combination thereof, that execute one or more software application(s) that manage such data. For example, in some embodiments, the apparatus 200 executes one or more software application(s) that maintain the data architecture(s) as depicted and described to, integrate third-party DevOps tools with an DevOps data connection platform for access by users of the DevOps data connection platform, wherein data/information may be shared between the DevOps data connection platform and an integrated third-party DevOps tool for provisioning of services/resources provided by the third-party DevOps tools.

FIG. 3 illustrates a visualization of an example data environment for establishing generic container connection between third-party DevOps tools and a DevOps data connection platform in accordance with at least some embodiments of the present disclosure. Specifically, the data environment for establishing generic container connection with third-party DevOps tools is performed by the third-party container connection system 103. In some embodiments, the third-party container connection system 103 is embodied by the apparatus 200 as depicted and described herein. In some embodiments, the third-party container connection system 103 causes rendering of, or otherwise provides access to, one or more user interfaces specially configured to enable inputting of data.

In some embodiments, a third-party container connection request 302 is received by the third-party container connection system 103 (e.g., via the container connection circuitry 205 thereof). In some embodiments, the third-party container connection request 302 is received from a client computing device. The client computing device may be associated with a DevOps team member. Alternatively or additionally, in some embodiments, the third-party container connection request 302 is received from an external computing device associated with a third-party DevOps tool. The third-party container connection request may comprise a request to establish a data connection between a particular third-party DevOps tool and the DevOps data connection platform. In some embodiments, the third-party container connection request 302 includes a third-party DevOps tool identifier. Alternatively or additionally, in some embodiments, the third-party container connection request 302 includes third-party identifier, data that describes the resources/services provided by the third-party DevOps tool, and/or other data that may be leveraged to facilitate seamless third-party DevOps tool container connection. In some embodiments, the third-party container connection request 302 comprises a category identifier. The category identifier may be configured to uniquely identify a group of DevOps tools from other DevOps tools. For example, the category identifier may comprise a DevOps tool type identifier configured to uniquely identify a group of DevOps tools based on the resource/service type provided by the DevOps tool. As another example, the category identifier may comprise a third-party type identifier configured to uniquely identify a group of DevOps tools based on the third-party type. It should be understood that the category identifier may comprise other type of identifiers.

In some embodiments, a connection data object 304 is generated and transmitted to the third-party DevOps tool associated with the third-party container connection request 302. For example, the third-party container connection system 103 may generate and transmit the connection data object 304 to an external computing device associated with the third-party DevOps tool. In some embodiments, the connection data object comprises information describing a generic container connection protocol for establishing a container connection with the DevOps data connection platform. Alternatively or additionally, in some embodiments, the connection data object may comprise instructions for establishing a container connection with the DevOps data connection platform based on a generic container connection protocol. Alternatively or additionally, in some embodiments, the container connection data object may comprise the third-party container connection request 302. In some embodiments, the third-party container connection system 103 may transmit the third-party container connection request 302 to the third-party DevOps tool. For example, the third-party container connection request 302 may transmit the third-party container connection request 302 and the connection data object 304 to the third-party DevOps tool.

In some embodiments, the connection data object may comprise information describing a network endpoint with which a communication link may be established to enable container connection between the third-party DevOps tool and the DevOps data connection platform (e.g., third-party container connection system 103). The network endpoint, for example, may be configured to allow connection information and/or other data to be exchanged between the third-party DevOps tool and the DevOps data connection platform (e.g., computing devices thereof). Alternatively or additionally, in some embodiments, the connection data object may comprise security layers specifications, system protocols, and/or other guidelines/requirements to facilitate secure, seamless, and efficient container connection with third-party DevOps tools 104A-104N, as described herein.

In some embodiments, a generic container connection 306 is established. In some embodiments, the generic container connection 306 is established based on a generic container connection model and interaction with the third-party DevOps tool (e.g., via an external computing device associated with the third-party DevOps tool). The generic container connection model, for example, may define a generic container connection protocol. In some embodiments, the generic container connection model is a global generic container connection model configured for establishing a container connection with any third-party DevOps tool. In some embodiments, the generic container connection model is a per-category generic container connection model of a plurality of per-category generic container connection models. Each per-category generic container connection model may be configured for establishing container connection with any DevOps tool associated with the particular category. For example, container connection for a group of DevOps tools having the same category identifier may be established based on a per-category generic container connection model associated with the category identifier. In this regard, the third-party container connection system 103 may be configured to establish one or more generic container connection models (e.g., one or more global generic container connection models and/or one or more per-category generic container connection models).

In some embodiments, the container connection is a generic container connection configured to enable container connection with a plurality of third-party DevOps tools based on a generic container connect protocol. In this regard, the generic container connection may enable third-party DevOps tools to seamlessly and efficiently connect with a DevOps data connection platform (e.g., third-party container connection system 103) such that data containers may be efficiently and effortlessly provided by the third-party DevOps tools 104A-104N for access by the DevOps data connection platform (e.g., third-party container connection system 103).

In some embodiments, the container connection may be a generic container connection (e.g. global generic container connection, category-based generic connection, and/or the like). Alternatively or additionally, the connection data object may comprise a network endpoint with which a communication link may be established to enable container connection between a third-party DevOps tool and the DevOps data connection platform. In some embodiments, the connection data object may comprise security layers specifications, system protocols, and/or other guidelines/requirements to achieve third-party DevOps tool container connection.

In some embodiments, a multi-resource software development work graph 310 is updated 308 based on DevOps data received from the third-party DevOps tool in connection with execution of one or more tasks, actions, operations, and/or the like associated with one or more software development projects.

FIG. 4, illustrates an example third-party DevOps tool container connection interface 400 in accordance with at least some embodiments of the present disclosure. As depicted in FIG. 4, the third-party DevOps tool container connection interface 400 may comprise a plurality of interface elements. In some embodiments, the third-party DevOps tool container connection interface 400 comprises third-party DevOps tool list 402. The integrated third-party DevOps tool list may comprise one or more selectable third-party DevOps tool interface elements 404, each associated with an integrated third-party DevOps tool. A third-party container connection request may, for example, be generated in response to user engagement (e.g., click, selection, and/or the like) with a third-party DevOps tool interface element 404. By way of example, a first third-party DevOps tool (e.g., third-party DevOps tool 104A) may be associated with GitHub for Jira, a second third-party DevOps tool (e.g., third-party DevOps tool 104B) may be associated with GitLab, and/or the like. In some embodiments, the third-party DevOps tool container connection interface 400 may configured to render third-party DevOps tool list 402 for a particular DevOps tool type, for example, in response to user tool selection. By way of example, the third-party DevOps tool container connection interface 400 may render third-party DevOps tool list 402 that comprises third-party DevOps tool interface elements 404 that are repository tools in response to user selection of a DevOps tool type of one or more DevOps tool types. The third-party DevOps tool container connection interface 400, for example, may include a DevOps tool type interface element 406 configured to allow a user to select a DevOps tool type. The third-party DevOps tool container connection interface 400 may be configured to render a corresponding third-party DevOps tool list 402 in response to the user selection.

FIG. 5 illustrates a visualization of an example data environment for providing visibility in a DevOps environment in accordance with at least some embodiments of the present disclosure. Specifically, the data environment for providing visibility in a DevOps environment is performed by the third-party container connection system 103. In some embodiments, the third-party container connection system 103 is embodied by the apparatus 200 as depicted and described herein. In some embodiments, the third-party container connection system 103 causes rendering of, or otherwise provides access to, one or more user interfaces specially configured to enable inputting of data.

In some embodiments, the third-party container connection system 103 receives a software development event indication 502. In some embodiments, the software development event includes actions, activities, operations, and/or the like associated with a software development project in a DevOps environment, where DevOps data is generated in connection with execution of the actions, activities, operations, and/or the like. The software development event indication may, for example, indicate generation of a software development project, generation of an issue object, a pull request, and/or the like. For example, the software development event may comprise a software development project generation event, issue object generation event, a pull request event, and/or other software development activities.

In some embodiments, the third-party container connection system 103 receives or otherwise accesses DevOps data 504 generated in connection with the software development event. The third-party container connection system 103 may receive the DevOps data from connected DevOps tools. A connected DevOps tool may describe a DevOps tool that is configured to provide DevOps data to the third-party container connection system 103 based on a generic container connection model. The third-party container connection system 103 may receive, resource objects from one or more DevOps tools (e.g., connected DevOps tools) in connection with the execution of one or more software delivery projects.

For example, the third-party container connection system 103 may receive issue data objects associated with a particular software development project from a first DevOps tool and may receive pull requests associated with the particular software development project from a second DevOps tools.

In some embodiments, the third-party container connection system 103 may be configured to update 506 a multi-resource software development work graph based on DevOps data received from the third-party DevOps tools 104A-104N. Alternatively or additionally, the third-party container connection system 103 may be configured to facilitate and/or cause generation and/or updating of the multi-resource software development work graph at least in part by providing the DevOps data to one or more other systems configured to generate and/or update the multi-resource software development work graph. The multi-resource software development work graph, for example, may represent relationships among and between various DevOps tools and/or DevOps data associated with one or more software development projects. For example, the multi-resource software development work graph may represent relationships among and between code pull requests, issue objects, code repository identifiers, commitments, and/or the like.

In some embodiments, the third-party container connection system 103 is configured to generate and render a resource tool interface. In some embodiments, the resource tool interface comprises a visualization of the DevOps data received from the DevOps tools leveraged by the DevOps team to execute one or more software development projects and/or data derived from the DevOps data. Alternatively or additionally, in some embodiments, the resource tool interface may comprise a visualization of the DevOps tools leveraged by the DevOps team to execute the one or more software development projects and/or interactions/relationships between the DevOps tools and/or DevOps data. The resource tool interface, for example, may display at least a portion of the multi-resource software development work graph or otherwise a representation of at least a portion of the multi-resource software development work graph in some form.

In some embodiments, the third-party container connection system 103 (e.g., toolchain circuitry 206 thereof) is configured to facilitate configuration of the third-party DevOps tools. The third-party container connection system 103, for example, may be configured to facilitate configuration of a third-party DevOps tool subsequent to establishing a container connection with the third-party DevOps tool. In some embodiments, the third-party container connection system 103 renders for display on the client computing device, a configuration prompt object to facilitate configuration of a particular third-party DevOps tool.

FIG. 6 illustrates a flowchart including example operations of an example process for integrating third-party DevOps tools with an DevOps data connection platform in accordance with at least one embodiment of the present disclosure. Specifically, FIG. 6 illustrates an example computer-implemented process 600. In some embodiments, the process 600 is embodied by computer program code stored on a non-transitory computer-readable storage medium of a computer program product configured for execution to perform the process as depicted and described. Alternatively or additionally, in some embodiments, the process 600 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 201 and/or another component depicted and/or described herein and/or otherwise accessible to the apparatus 200, for performing the operations as depicted and described.

The operations illustrated in FIG. 6 may, for example, be performed by, with the assistance of, and/or under the control of an apparatus 200, as described above. In this regard, performance of the operations may invoke one or more of memory 201, processor 202, input/output circuitry 203, communications circuitry 204, container connection circuitry 205, and/or toolchain circuitry 206.

In some embodiments, the apparatus 200 is in communication with one or more external apparatus(es), system(s), device(s), and/or the like, to perform one or more of the operations as depicted and described. For purposes of simplifying the description, the process 600 is described as performed by and from the perspective of the apparatus 200.

In the embodiment illustrated in FIG. 6, the flowchart illustrates method 600 which includes generating one or more generic container connection models at Block 602. For example, the apparatus may include means, such as the processor 202, communications circuitry 204, container connection circuitry 205, toolchain circuitry 206, or the like for generating one or more generic container connection models. In some embodiments a generic container connection model defines a generic container connection protocol. In some embodiments, the one or more generic container connection model comprises a global generic container connection model. In some embodiments, the one or more generic container connection models comprise a plurality of per-category generic container connection models. In some embodiments, a global generic container connection model is configured for establishing a container connection with any third-party DevOps tool. For example, the generic container connection model may comprise a global generic container connection model configured for establishing container connection with any of a plurality of DevOps tools.

In some embodiments, a per-category generic container connection model is associated with a particular category identifier and configured for establishing container connection with any third-party DevOps tool associated with the particular category identifier. For example, container connection for a group of DevOps tools having the same category identifier may be established based on a per-category generic container connection model associated with the category identifier. For example, the generic container connection model may comprise a per-category generic container connection model of a plurality of per-category generic container connection models. In such some embodiments, each per-category generic container connection model configured for establishing container connection with a group of DevOps tools associated with a category identifier corresponding to the respective per-category generic container connection model.

At Block 604, apparatus may include means, such as the processor 202, communications circuitry 204, container connection circuitry 205, toolchain circuitry 206, or the like for receiving a third-party container connection request. The third-party container connection request may comprise a third-party DevOps tool identifier, data describing resources/services provided by the third-party DevOps tool associated with the third-party identifier or other data associated with the third-party DevOps tool and/or third-party DevOps tool provider. In some embodiments, the third-party container connection request may comprise a category identifier. The third-party DevOps tool may be configured to provide one or more services/resources leveraged in a DevOps environment to execute, perform, manage, and/or the like one or more software development projects, work units, and/or phases of a software development project. For example, a particular third-party DevOps tool may be configured to provide code repositories. As another example, a particular third-party DevOps tool may be leveraged to generate code pull requests, issue objects, and/or other resource objects associated with executing and delivering a software development project.

At Block 606, the apparatus may include means, such as the processor 202, communications circuitry 204, container connection circuitry 205, toolchain circuitry 206, or the like for generating and transmitting a connection data object to the third-party DevOps tool (e.g. via external computing device associated with the third-party DevOps tool). In some embodiments, the connection data object comprises information configured to facilitate seamless and efficient container connection. For example, the connection data object may comprise data that describes the network endpoint for establishing a communication link between the third-party DevOps tool and the DevOps data connection platform. Alternatively or additionally, in some embodiments, the connection data object comprises data/information regarding the generic container connection protocol, security layer specifications, and/or other guidelines requirements to facilitate optimized third-party container connection.

At Block 608, the apparatus may include means, such as the processor 202, communications circuitry 204, container connection circuitry 205, toolchain circuitry 206, or the like, for establishing a container connection with the third-party DevOps tool based on a corresponding generic container connection model. In some embodiments, the generic container connection model defines object schemas configured to easily map to third-party DevOps tools objects and data structures to facilitate seamless and efficient container connection. In some embodiments, a generic container connection model defines a generic container connection protocol the comprises a schema for mapping objects and data structure associated with the third-party DevOps tool.

In some embodiments, the corresponding generic container connection model may comprise a global generic container connection model. In some embodiments, the corresponding generic container connection model may comprise a per-category generic container connection model selected from a plurality of per category generic container connection models based on the category identifier associated with the third-party DevOps tool. For example, the generic connect model may comprise a per-category generic container connection model associated with a category identifier for the third-party DevOps tool. Each per-category generic container connection model, for example, may define object schemas configured to map to third-party DevOps tools object and data structures of third-party DevOps having a category identifier corresponding to the category identifier associated with the respective per-category generic container connection model.

In some embodiments, establishing the container connection comprises interaction with the third-party DevOps tool. In some embodiments, establishing the container connection comprises exposing and/or otherwise identifying a network endpoint with which a communication link may be established to enable data exchange between the third-party DevOps tool and the DevOps data connection platform such that data may be exchanged between the third-party DevOps tool and the DevOps data connection platform. In some embodiments, the generic container connection protocol comprises utilizing an API associated with the DevOps data connection platform to exchange data between the third-party DevOps tool and the DevOps data connection platform. In some embodiments, the generic container connection model is associated with an API-based connection. For example, DevOps data generated and/or maintained by the DevOps tool in connection with one or more software development projects may be received via an API. In some embodiments, the generic container connection model is associated with an OAuth-based connection. For example, DevOps data generated and/or maintained by the DevOps tools in connection with one or more software development projects may be received based on user credentials.

At Block 610, the apparatus may include means, such as the processor 202, communications circuitry 204, container connection circuitry 205, toolchain circuitry 206, or the like for updating a multi-resource software development work graph based on DevOps data received from the third-party DevOps tools 104A-104N in connection with one or more software development projects. Alternatively or additionally, the apparatus may include means, such as the processor 202, communications circuitry 204, container connection circuitry 205, toolchain circuitry 206, or the like for facilitating and/or causing generation and/or updating of the multi-resource software development work graph at least in part by providing the DevOps data to one or more other systems configured to generate and/or update the multi-resource software development work graph. The multi-resource software development work graph, for example, may represent relationships among and between various DevOps tools and/or DevOps data associated with one or more software development projects. For example, the multi-resource software development work graph may represent relationships among and between code pull requests, issue objects, code repository identifiers, commitments, and/or the like.

FIG. 7 illustrates a flowchart including example operations of an example process for providing visibility in a DevOps environment in accordance with at least one embodiment of the present disclosure. Specifically, FIG. 7 illustrates an example computer-implemented process 700. In some embodiments, the process 700 is embodied by computer program code stored on a non-transitory computer-readable storage medium of a computer program product configured for execution to perform the process as depicted and described. Alternatively or additionally, in some embodiments, the process 700 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 201 and/or another component depicted and/or described herein and/or otherwise accessible to the apparatus 200, for performing the operations as depicted and described.

The operations illustrated in FIG. 7 may, for example, be performed by, with the assistance of, and/or under the control of an apparatus 200, as described above. In this regard, performance of the operations may invoke one or more of memory 201, processor 202, input/output circuitry 203, communications circuitry 204, container connection circuitry 205, and/or toolchain circuitry 206.

In some embodiments, the apparatus 200 is in communication with one or more external apparatus(es), system(s), device(s), and/or the like, to perform one or more of the operations as depicted and described. For purposes of simplifying the description, the process 700 is described as performed by and from the perspective of the apparatus 200.

In the embodiment illustrated in FIG. 7, the flowchart illustrates method 700 which includes receiving a software development event indication at Block 702. For example, the apparatus may include means, such as the processor 202, communications circuitry 204, container connection circuitry 205, toolchain circuitry 206, or the like configured for receiving a software development event indication. In some embodiments, the software development event includes actions, activities, operations, and/or the like associated with a software development project in a DevOps environment, where DevOps data is generated in connection with execution of the actions, activities, operations, and/or the like. The software development event indication may, for example, indicate generation of a software development project, generation of an issue object, a pull request, and/or the like. For example, the software development event may comprise a software development project generation event, issue object generation event, a pull request event, and/or other software development activities.

At Block 704, the apparatus may include means, such as the processor 202, communications circuitry 204, container connection circuitry 205, toolchain circuitry 206, or the like configured for receiving or otherwise accessing DevOps data generated in connection with the software development event. The apparatus may receive the DevOps data from connected DevOps tools. The apparatus may receive, resource objects from one or more DevOps tools (e.g., connected DevOps tools) in connection with the execution of one or more software delivery projects. For example, the apparatus may receive issue data objects associated with a particular software development project from a first DevOps tool and may receive pull requests associated with the particular software development project from a second DevOps tools.

At Block 706, the apparatus may include means, such as the processor 202, communications circuitry 204, container connection circuitry 205, toolchain circuitry 206, or the like configured for generating and rendering a resource tool interface. The apparatus, for example may cause rendering of a resource tool interface for display on a client computing device, wherein the resource tool interface comprises a visualization of the DevOps data and/or data derived based on the DevOps data. In some embodiments, the resource tool interface comprises a visualization of the DevOps data received from the DevOps tools leveraged by the DevOps team to execute one or more software development projects and/or data derived from the DevOps data. Alternatively or additionally, in some embodiments, the resource tool interface may comprise a visualization of the DevOps tools leveraged by the DevOps team to execute the one or more software development projects and/or interactions/relationships between the DevOps tools and/or DevOps data.

In some embodiments, the apparatus may be configured to update a multi-resource software development work graph based on DevOps data received from the third-party DevOps tools 104A-104N. Alternatively or additionally, the apparatus may be configured to facilitate and/or cause generation and/or updating of the multi-resource software development work graph at least in part by providing the DevOps data to one or more other systems configured to generate and/or update the multi-resource software development work graph. The multi-resource software development work graph, for example, may represent relationships among and between various DevOps tools and/or DevOps data associated with one or more software development projects. For example, the multi-resource software development work graph may represent relationships among and between code pull requests, issue objects, code repository identifiers, commitments, and/or the like. The resource tool interface may be configured to display at least a portion of the multi-resource software development work graph or otherwise a representation of at least a portion of the multi-resource software development work graph in some form.

In some embodiments, the apparatus is configured to facilitate configuration of the third-party DevOps tools. The apparatus, for example, may be configured to facilitate configuration of a third-party DevOps tool subsequent to establishing a container connection with the third-party DevOps tool. In some embodiments, the apparatus renders for display on the client computing device, a configuration prompt object to facilitate configuration of a particular third-party DevOps tool.

Conclusion

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for third-party DevOps tool data connection in a DevOps environment, the apparatus comprising at least one processor, and at least one non-transitory memory including program code, the at least one non-transitory memory and the program code configured to, with the at least one processor, cause the apparatus to:

generate a generic container connection model defining a generic container connection protocol;

transmit computer-executable instructions configured to cause, based on the generic container connection model and interaction with a third-party DevOps tool, a generic container connection with the third-party DevOps tool to access DevOps data generated via the third-party DevOps tool, wherein transmitting the computer-executable instructions comprises transmitting a connection data object comprising data describing one or more of a network endpoint, instructions for establishing the generic container connection based on the generic container connection protocol, or security layer specifications;

receive, from the third-party DevOps tool based on the generic container connection, DevOps data associated with a software development project executed at least in part using the third-party DevOps tool; and cause updating of a multi-resource software development work graph based on the DevOps data.

2. The apparatus of claim 1, wherein the connection data object comprises data describing the generic container connection protocol.

3. The apparatus of claim 1, wherein the generic container connection model is associated with an API-based connection, wherein receiving the DevOps data based on the generic container connection comprises receiving the DevOps data using an API.

4. The apparatus of claim 1, wherein the generic container connection model is associated with an OAuth-based connection, wherein receiving the DevOps data based on the generic container connection comprises receiving the DevOps data based on user credentials.

5. The apparatus of claim 1, wherein the generic container connection protocol comprises a schema for mapping data structure associated with the third-party DevOps tool.

6. The apparatus of claim 1, wherein the generic container connection model comprises a global generic container connection model configured for establishing generic container connection with any of a plurality of DevOps tools.

7. The apparatus of claim 1, wherein the generic container connection model comprises a per-category generic container connection model of a plurality of per-category generic container connection models, each per-category generic container connection model configured for establishing container connection with a group of DevOps tools associated with a category identifier corresponding to the per-category generic container connection model.

8. The apparatus of claim 1, wherein the at least one non-transitory memory and the program code are configured to, with the at least one processor, further cause the apparatus to:

cause rendering of a resource tool interface for display on a client computing device, wherein the resource tool interface comprises a visualization of the DevOps data and/or data derived based on the DevOps data.

9. A computer-implemented method for third-party DevOps tool data connection in a DevOps environment, the computer-implemented method comprising: generating a generic container connection model defining a generic container connection protocol;

receiving a third-party container connection request associated with a third-party DevOps tool identifier;

transmitting computer-executable instructions configured to cause, based on the generic container connection model and interaction with a third-party DevOps tool associated with the third-party DevOps tool identifier, a generic container connection with the third-party DevOps tool to access DevOps data generated via the third-party DevOps tool, wherein transmitting the computer-executable instructions comprises transmitting a connection data object comprising data describing one or more of a network endpoint, instructions for establishing the generic container connection based on the generic container connection protocol, or security layer specifications;

receiving, from the third-party DevOps tool based on the generic container connection, DevOps data associated with a software development project executed at least in part using the third-party DevOps tool; and causing updating of a multi-resource software development work graph based on the DevOps data.

10. The computer-implemented method of claim 9, wherein the connection data object comprises data describing the generic container connection protocol.

11. The computer-implemented method of claim 9, wherein the generic container connection model is associated with an API-based connection, wherein receiving the DevOps data based on the generic container connection comprises receiving the DevOps data using an API.

12. The computer-implemented method of claim 9, wherein the generic container connection model is associated with an OAuth-based connection, wherein receiving the DevOps data based on the generic container connection comprises receiving the DevOps data based on user credentials.

13. The computer-implemented method of claim 9, wherein the generic container connection protocol comprises a schema for mapping data structure associated with the third-party DevOps tool.

14. The computer-implemented method of claim 9, wherein the generic container connection model comprises a global generic container connection model configured for establishing container connection with any of a plurality of DevOps tools.

15. The computer-implemented method of claim 9, wherein the generic container connection model comprises a per-category generic container connection model of a plurality of per-category generic container connection models, each per-category generic container connection model configured for establishing container connection with a group of DevOps tools associated with a category identifier corresponding to the per-category generic container connection model.

16. An at least one non-transitory computer-readable storage medium for third-party DevOps tool data connection in a DevOps environment, the at least one non-transitory computer-readable storage medium having computer coded instructions configured to, when executed by at least one processor:

generate a per-category generic container connection model for a category identifier of a plurality of category identifiers, the per-category generic container connection model defining a generic container connection protocol associated with the category identifier;

transmit computer-executable instructions configured to cause, based on the per-category generic container connection model and interaction with a third-party DevOps tool, a generic container connection with the third-party DevOps tool to access DevOps data generated via the third-party DevOps tool, wherein transmitting the computer-executable instructions comprises transmitting a connection data object comprising data describing one or more of a network endpoint, instructions for establishing the generic container connection based on the generic container connection protocol, or security layer specifications;

receive, from the third-party DevOps tool based on the generic container connection, DevOps data associated with a software development project executed at least in part using the third-party DevOps tool; and cause updating of a multi-resource software development work graph based on the DevOps data.

* * * * *